(12) United States Patent
Gandhi et al.

(10) Patent No.: US 7,442,283 B1
(45) Date of Patent: *Oct. 28, 2008

(54) HYDROGEN PEROXIDE GENERATOR

(75) Inventors: Sanjay N. Gandhi, Mount Prospect, IL (US); Robert T. Sprague, Crystal Lake, IL (US); Lin Li, Mount Prospect, IL (US); Massimo Sangalli, Chicago, IL (US); Kurt M. Vanden Bussche, Lake in the Hills, IL (US); Richard A. Janicki, Orland Park, IL (US); Anil R. Oroskar, Oakbrook, IL (US); Laszlo T. Nemeth, Barrington, IL (US); Kerry S. Crosby, Mount Prospect, IL (US); Pat Palmese, Carol Stream, IL (US)

(73) Assignee: UOP LLC, Des Plaines, IL (US)

( * ) Notice: Subject to any disclaimer, the term of this patent is extended or adjusted under 35 U.S.C. 154(b) by 515 days.

This patent is subject to a terminal disclaimer.

(21) Appl. No.: 11/038,348

(22) Filed: Jan. 18, 2005

(51) Int. Cl.
*C25B 1/04* (2006.01)
*C01B 15/029* (2006.01)
*C01B 15/027* (2006.01)

(52) U.S. Cl. ............... 204/232; 204/241; 204/274; 204/275.1; 204/278; 204/278.5

(58) Field of Classification Search ............... 204/198
See application file for complete search history.

(56) References Cited

U.S. PATENT DOCUMENTS

| 4,144,144 | A | | 3/1979 | Radimer et al. ............... 204/82 |
|---|---|---|---|---|
| 4,382,011 | A | * | 5/1983 | Lurie ........................ 252/184 |
| 4,468,303 | A | * | 8/1984 | Griffin et al. .................. 75/737 |
| 4,568,440 | A | * | 2/1986 | Sutter et al. ................. 204/268 |
| 4,921,596 | A | * | 5/1990 | Chou et al. .................. 208/113 |
| 5,779,866 | A | * | 7/1998 | Tarancon .................... 204/262 |
| 5,972,118 | A | * | 10/1999 | Hester et al. ................... 127/1 |
| 2007/0131540 | A1 | * | 6/2007 | Nemeth et al. ............. 204/242 |

* cited by examiner

*Primary Examiner*—Harry D Wilkins, III
(74) *Attorney, Agent, or Firm*—Arthur E Gooding

(57) ABSTRACT

A device and process is presented for producing hydrogen peroxide on an as needed basis is disclosed. The process and device produces hydrogen peroxide on a small scale without the addition of chemicals and disposal of waste streams.

17 Claims, 3 Drawing Sheets

HYDROGEN PEROXIDE GENERATOR

FIELD OF THE INVENTION

This invention relates to the production of hydrogen peroxide. Specifically, an apparatus for the production of hydrogen peroxide in an acidic solution, and the subsequent separation and recycle of the acid from the hydrogen peroxide.

BACKGROUND OF THE INVENTION

The production of hydrogen peroxide is currently produced by a chemical process that is sufficiently complex that it requires large scale production to economically produce it. The most common method for hydrogen peroxide is the industrial scale production through an indirect reaction of hydrogen and oxygen employing alkylanthraquinone as the working material. In a first catalytic hydrogenation step, the alkylanthraquinone, dissolved in a working solution comprising organic solvents (e.g. di-isobutylcarbinol and methyl naphthalene), is converted to alkylanthrahydroquinone. In a separate autooxidation step, this reduced compound is oxidized to regenerate the alkylanthraquinone and yield hydrogen peroxide. Subsequent separation by aqueous extraction, refining, and concentration operations are then employed to give a merchant grade product.

The direct production of hydrogen peroxide directly from oxygen and hydrogen is another route. However, these methods involve working with gases in a combustible range, or with liquids having low concentrations of hydrogen and oxygen dissolved in the liquid phase.

The production of hydrogen peroxide on a small scale as needed would be beneficial as the user of the hydrogen peroxide would not need to store it. In order for methods of small scale production of hydrogen peroxide to be useful, the process and apparatus should be sufficiently self contained as to remove the need for adding additional chemicals, or for operating under conditions that can produce a potentially dangerous situation.

SUMMARY OF THE INVENTION

The present invention is an apparatus that provides for the production of hydrogen peroxide under conditions that can be operated in a home environment and without the continuous addition of chemicals. The apparatus comprises an electrolyzer for generating an oxidizing agent, a hydrolyzing reactor for reacting the oxidizing agent and water to generate hydrogen peroxide, a separation unit for separating the hydrogen peroxide, and a condensing unit. This apparatus can produce hydrogen peroxide in either a continuous or batch mode.

In one embodiment, the invention is a self-contained device that recirculates an oxidizing agent, and produces hydrogen peroxide from water. The apparatus includes a housing, or shell, that has a plurality of zones wherein an electrolyzer, a hydrolyzer, and a condensing unit are disposed within the housing, and wherein different zones are operated at different temperatures. By recirculating the oxiding agent through the invention, hydrogen peroxide is formed and separated from the oxidizing agent for use on an as-needed basis.

Additional objects, embodiments and details of this invention can be obtained from the following detailed description of the invention.

DETAILED DESCRIPTION OF THE INVENTION

The production of hydrogen peroxide in an aqueous solution and free from other chemical reactants is important for many applications. In addition, it would be preferable to produce the hydrogen peroxide on an as needed basis for use in bleaching and sanitizing removing the need to store hydrogen peroxide, or the need to process other chemicals that require special handling.

Figure 1:
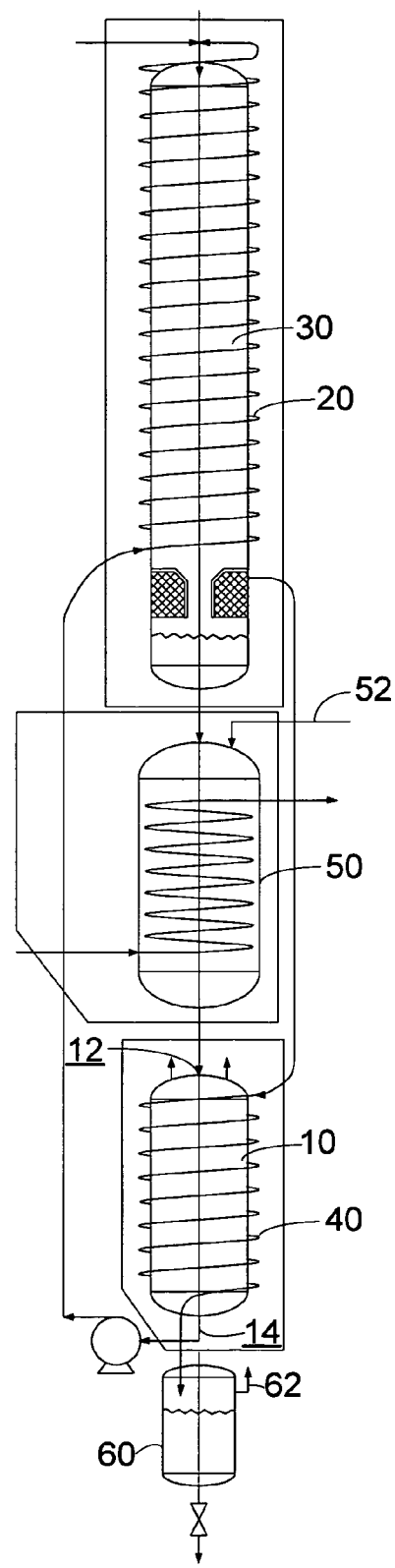
FIG. 1 is a diagram of a first embodiment of the invention.

The present invention provides for an apparatus to generate hydrogen peroxide with only the addition of water and air. In a first embodiment, the invention comprises an apparatus for the continuous generation of hydrogen peroxide. The apparatus, as shown in FIG. 1, comprises an electrolyzer 10 for generating an oxidizing agent, a hydrolyzing reactor 20, an air stripping and separation unit 30, and a condensing unit 40. While an air stripping unit 30 is contemplated, other gases can be used in the air stripping unit 30, and it is understood that when using the term air, any gas can be used, unless otherwise specifically stated. The electrolyzer 10 includes an inlet 12 for admitting a solution including an oxidizable compound, an outlet 14 for a solution including an oxidizing agent, and electrodes for supplying the electrical energy to convert the oxidizable compound to the oxidizing agent. Electrolyzers 10 are well known in the art, and are especially known for the use in dissociating water into hydrogen and oxygen. Electrolyzers 10 are also of use for facilitating chemical reactions where the reaction is for the oxidation of an already oxidized compound. In the present invention, the preferred oxidizable compound is sulfuric acid, and is oxidized to the oxidizing agent of persulfuric acid. Persulfate production in an electrolytic cell is demonstrated in U.S. Pat. No. 4,144,144, which is incorporated by reference in its entirety. While other oxidizable compounds and oxidizing agents are contemplated, for the sake of convenience, the preferred oxidizable compound is sulfuric acid, and the preferred oxidizing agent is persulfuric acid, and will be used interchangeably herein.

The electrolyzer is operated at a temperature from about 20° C. to about 40° C. The temperature is controlled to prevent the electrolyzer from getting too hot, wherein the persulfuric acid would begin to break down. An aqueous solution of persulfuric acid is drawn off from the electrolyzer 10 and directed to a hydrolyzing reactor 20. The hydrolyzing reactor 20 is preferably a tubular reactor and sized to provide sufficient residence time to drive the reaction to equilibrium. This comprises designing a tubular reactor of sufficient length. The reactor 20 is heated to drive the equilibrium toward the production of hydrogen peroxide and forming a solution comprising hydrogen peroxide and sulfuric acid. The reactor 20 is heated to a temperature between about 40° C. and about 85° C., with a preferred operating temperature from about 60° C. to about 70° C.

The solution of hydrogen peroxide and sulfuric acid is passed to an air stripping and separation unit 30. The solution and air are mixed and enter the separation unit 30 where there is further heating of the solution to transfer hydrogen peroxide and water to the gas phase. The sulfuric acid is concentrated as a liquid when the water and hydrogen peroxide evaporate. The sulfuric acid is collected and cooled in a cooling tank 50 before redirecting the sulfuric acid to the electrolyzer 10. In addition, water 52 is added to the cooling tank to replenish the water lost in the production of hydrogen peroxide.

The air stripping unit 30 is operated such that during the separation process wherein the hydrogen peroxide is transferred to the gas phase, virtually all of the sulfuric acid is retained in the liquid phase, and some of the hydrogen peroxide can be retained in the liquid phase. While this does not recover all of the hydrogen peroxide, the operation is such that the sulfuric acid is substantially completely recycled and the further addition of sulfuric acid is only periodically needed to make up for minor losses.

The stripping unit 30 can use gas, or air, that has been preheated to facilitate the evaporation of hydrogen peroxide and water from the liquid hydrogen peroxide solution. This could entail an inline heating unit (not shown) for the gas inlet to the stripping unit 30, or some other means known in the art for heating a gas.

The stripping unit 30 can further include a means for creating a mist from the hydrogen peroxide/sulfuric acid solution. By creating a mist of the solution in the stripping/separation unit 30, mass transfer is facilitated to enhance the rate at which hydrogen peroxide and water are evaporated into the vapor phase. Means for creating a mist include spray nozzles sized to generate a fine mist, and nebulizers for mixing the gas with the liquid and forming a mist.

While the preferred embodiment comprises an air stripping unit 30 for the separation unit, other separation units are contemplated by this invention, including but not limited to a distillation unit, or an adsorption separation unit.

In one embodiment, the hydrolyzing reactor 20 is coiled around the air stripping unit 30 where heating of both the reactor 20 and stripping unit 30 is integrated.

The gas in the air stripping unit 30 is passed through a mist eliminator 32 to remove residual droplets that can have sulfuric acid in them. The gas containing hydrogen peroxide and water is cooled and condensed, and in one embodiment, the gas is passed through a condensing coil 40 with the liquid condensate collected in a storage tank 60. The storage tank 60 includes an air vent 62, to release the air added to the system in the air stripping unit 30. The mist eliminator 32, preferably, will remove all droplets having a diameter greater than 0.05 micrometers.

Figure 2:
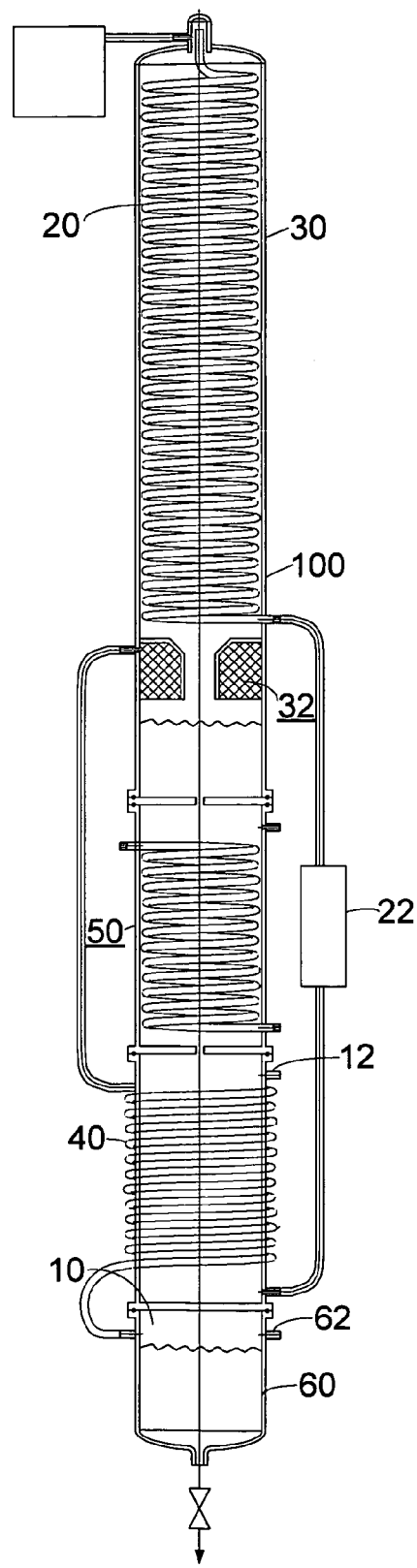
FIG. 2 is a diagram of a second embodiment of the invention.

In a second embodiment, as shown in FIG. 2, the apparatus is contained within a single shell 100. The shell 100 is divided into at least two sections, an electolyzer section 10 and an evaporator/separator section 30. Within the evaporator/separator section 30, is a hydrolyzing coil 20. The electrolyzer 10 generates a stream comprising persulfuric acid, and is directed to the hydrolyzing coil 20. In one embodiment, the means for directing the persulfuric acid stream to the hydrolyzing coil 20 is through a pump 22. The pump 22 is used to drive the fluids through the apparatus, and in a preferred embodiment, only one pump is needed to circulate the liquid phase within the apparatus. The hydrolyzing coil 20 is heated, and the persulfuric acid reacts with water in the hydrolyzing coil 20 to generate a solution comprising hydrogen peroxide and sulfuric acid.

The hydrogen peroxide solution generated in the hydrolyzing coil 20 is mixed with air creating a vapor liquid mixture, and enters the heated evaporation/separation section 30. The mixture separates into liquid and vapor phases as the mixture travels down the separation section 30. The hydrogen peroxide with some water is evaporated to the vapor phase, while the sulfuric acid is retained in the liquid phase, as the mixture travels through the heated section 30. The vapor phase passes through a demister, to remove liquid droplets that comprise sulfuric acid, and is directed to a condensing coil 40. The liquid sulfuric acid solution is collected at the bottom of the separator section 30 and passed through a cooling section 50 and returned to the electrolyzer 10. Water is added to the cooling section 50 to dilute the sulfuric acid and to make up for water losses from the reaction and carried out through the vapor phase. The added water also provides the benefit of reducing the viscosity of the sulfuric acid solution passing to the electrolyzer 10. The electrolyzer 10 includes a vent 12 for any gases generated during the electrolysis reaction.

The condensing coil 40 is wrapped around the electrolyzer 10, and both are located in a cooling section of the vessel 100. The hydrogen peroxide and water vapor are condensed and collected in a section 60 of the vessel 100 for storage, where it can be accessed as needed. The storage section 60 includes a vent 62 to vent air that is blown into the vessel 100 in the evaporator/separator section 30.

In this embodiment, the apparatus 100 is a self-contained unit wherein the operation requires the input of water, air, and electrical power, and generates an output of an aqueous hydrogen peroxide solution and air that is vented.

Figure 3:
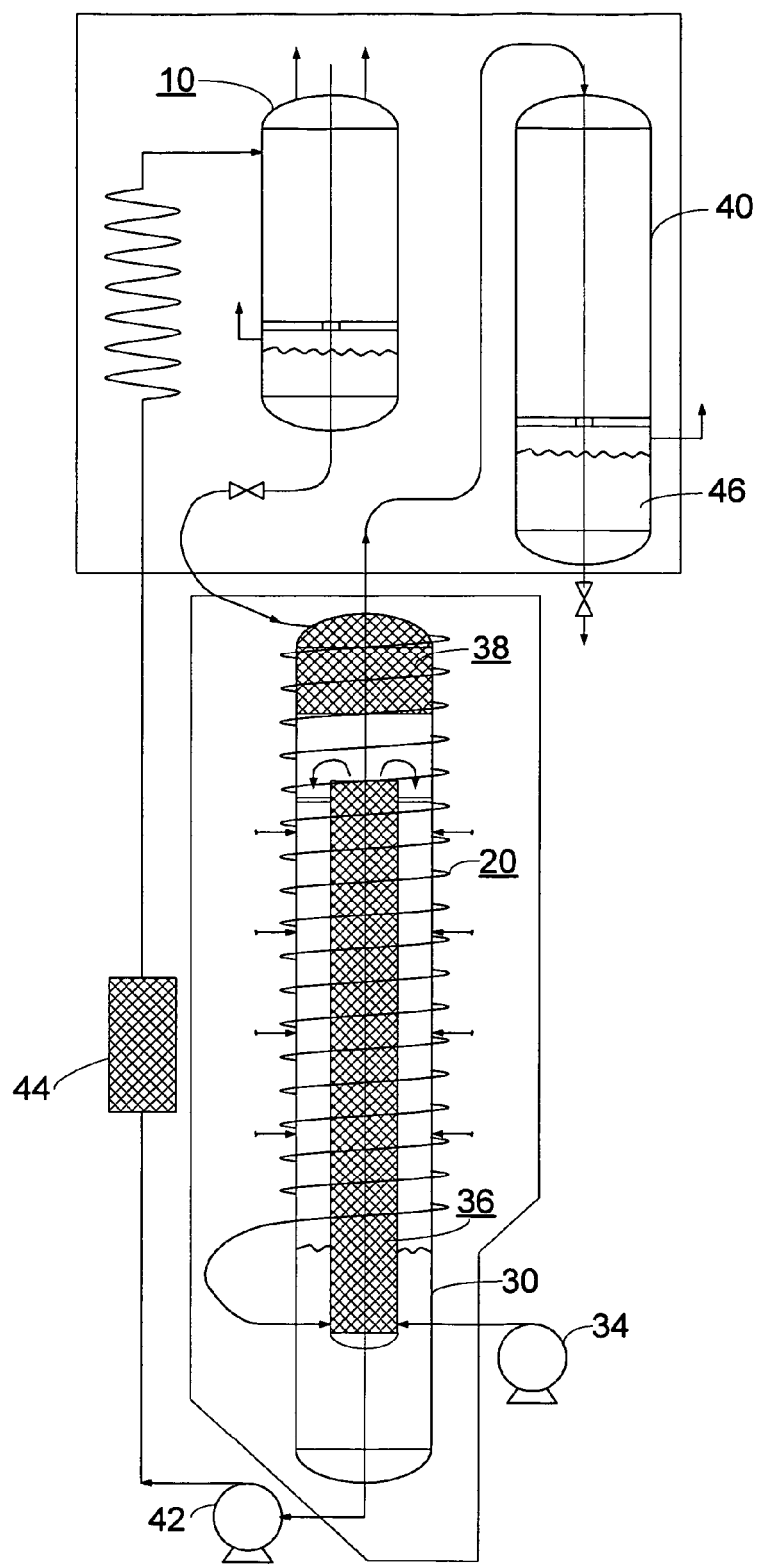
FIG. 3 is a diagram of a third embodiment of the invention.

In another embodiment, the apparatus is operated in batch mode. As shown in FIG. 3, the apparatus includes an electrolyzer 10 for generating a solution comprising an oxidizing agent. In this specific embodiment, the oxidizing agent is persulfuric acid. The electrolyzer 10 is operated at a temperature between 10° C. and 40° C. Preferably the temperature is from about 20° C. to about 40° C. The electrolyzer 10 is operated continuously to generate the persulfuric acid product, and the product is stored in a separate compartment to build up a supply of persulfuric acid. The compartment is vented to the atmosphere through a suction breaker.

The persulfuric acid solution is periodically drawn off from the electrolyzer 10 and directed to a hydrolyzing reactor 20 in the form of a coil of tubing and is disposed around an evaporator/separator unit 30. The acid solution is drawn off at a predetermined time, or when the storage compartment reaches a predetermined level. Level controllers and timers are well known in the art, and not discussed here. The hydrolyzing reactor is heated to a temperature between about 40° C. to about 85° C., with the temperature preferably between about 60° C. to about 70° C. The length of the coil is sized to provide sufficient residence time for the hydrolysis reaction and to allow the reaction to go to a desired conversion, generating a solution having hydrogen peroxide and sulfuric acid. In one embodiment, the desired conversion is substantially to equilibrium.

The hydrogen peroxide solution is fed into the evaporator/separator 30 heated to a temperature between about 60° C. and 85° C., and supplied with air by a blower 34. In an alternative, the air can be supplied from any compressed air source. The air and hydrogen peroxide solution are mixed and fed into a packed bed 36, where hydrogen peroxide and water transfer to the gas phase. The vapor and liquid phases exit the top of the packed bed 36 and the liquid and vapor are separated in the evaporator/separator 30. The vapor phase, containing hydrogen peroxide and water pass through a mist eliminator 38, and then the vapor is passed to a condensing unit 40 wherein a liquid hydrogen peroxide solution is collected. The mist eliminator 38 recovers substantially all entrained liquid droplets that have sulfuric acid in them. Air and uncondensed hydrogen peroxide and water vapor can be vented through a vent located in the condensing unit 40 or in a separate storage section 46. The separate storage section 46 may be a part of the condensing unit 40, or a separate tank. The peroxide solution can be stored in a part of the condensing unit 40, or can be stored in a separate unit (not shown) for uses wherein a larger storage is desired. Controllers, timers, and other devices can regulate the flow of peroxide solution from the hydrogen peroxide storage, and are well known in the art and not further discussed here.

The liquid phase in the evaporator/separator 30 comprises sulfuric acid, and is collected and returned to the electrolyzer 10. During the process, water is evaporated from the liquid phase, and the sulfuric acid solution becomes more viscous. Water can be added to dilute the sulfuric acid, and to reduce the viscosity of the liquid phase. Water is also added to replace water lost in the process of generating the hydrogen peroxide. The sulfuric acid is pumped from the separator 30 to the electrolyzer 10, and the pump 42 is used to maintain the pressure needed to circulate the fluids through the system.

In one embodiment, the apparatus further includes an adsorbent bed 44, comprising a material for removing contaminants that may enter the system. The adsorbent bed 44 is preferably designed to remove any metal impurities in the sulfuric acid. The adsorbent bed 44 may also include a cooling means to cool the sulfuric acid to the temperature of the electrolyzer. Cooling means includes cooling coils running through the adsorbent bed 44, or cooling jackets on the conduits transferring the sulfuric acid to the electrolyzer 10, or any other means known in the art for cooling a liquid.

In one embodiment, the hydrolyzer coil 20 is wound around the evaporator/separator 30. Both the hydrolyzer 20 and the separator 30 are heated and combining the two units provides for the ability to heat both in a single heating zone. In another embodiment, the hydrolyzer coil 20 is disposed within the evaporator/separator unit in a similar manner as shown in FIG. 2.

In general, the electrolyzer 10 and condensing unit 40 are situated in cooling zones of the apparatus, while the hydrolyzer 20 and the evaporator/separator 30 are situated in the heating zones of the apparatus.

While the invention has been described with what are presently considered the preferred embodiments, it is to be understood that the invention is not limited to the disclosed embodiments, but it is intended to cover various modifications and equivalent arrangements included within the scope of the appended claims.

What is claimed is:

1. An apparatus for the generation of hydrogen peroxide comprising:
    an electrolyzer for generating an oxidizing agent;
    a tubular hydrolyzing reactor for oxidizing water to hydrogen peroxide having an inlet in fluid communication with the electrolyzer, and an outlet for a solution comprising hydrogen peroxide;
    a separation unit having an inlet in fluid communication with the hydrolyzing reactor outlet, an gas inlet, a liquid outlet and a hydrogen peroxide gas outlet and where the separation unit is in the same heating zone with the hydrolyzing reactor; and
    a condensing unit in fluid communication with the hydrogen peroxide gas outlet to condense the hydrogen peroxide.

2. The apparatus of claim 1 wherein the electrolyzer comprises:
    an inlet for admitting a solution comprising an oxidizable compound;
    electrodes for providing electrical power to convert the oxidizable compound to the oxidizing agent; and
    an outlet for the withdrawal of the oxidizing agent.

3. The apparatus of claim 2 wherein the oxidizing agent is selected from the group consisting of persulfuric acid, inorganic persulfate salts, and mixtures thereof, and the oxidizable compound is selected from the group consisting of sulfuric acid, inorganic sulfate salts, and mixtures thereof.

4. The apparatus of claim 1 wherein the hydrolyzing reactor has a means for heating the reactor.

5. The apparatus of claim 1 wherein the hydrolyzing reactor further includes a water inlet port.

6. The apparatus of claim 1 wherein the separation unit is a gas stripping unit, comprising:
    an inlet for the hydrogen peroxide solution;
    an inlet for the gas, proximate to the inlet for the hydrogen peroxide solution; and
    a gas-liquid separation chamber with a liquid outlet and a gas outlet.

7. The apparatus of claim 6 further comprising a mist eliminator proximate to the gas outlet.

8. The apparatus of claim 7 wherein the mist eliminator comprises a material for removing liquid droplets of size greater than 0.05 micrometers in diameter.

9. The apparatus of claim 6 further comprising a source of heat.

10. The apparatus of claim 6 further comprising a means to generate a mist of the hydrogen peroxide solution.

11. The apparatus of claim 10 wherein the means for generating a mist is a spray nozzle, or a nebulizer.

12. The apparatus of claim 6 wherein the gas stripping unit further comprises a packed evaporation column disposed within the gas-liquid separation chamber, and having an inlet in fluid communication with the inlet for the hydrogen peroxide solution and with the inlet for the gas, and an outlet in fluid communication with the gas-liquid separation chamber.

13. The apparatus of claim 1 wherein the separation unit comprises a distillation unit, or an adsorption separation unit.

14. The apparatus of claim 1 wherein the oxidizing agent is persulfuric acid.

15. The apparatus of claim 1 further comprising a tank for collecting the condensed hydrogen peroxide.

16. The apparatus of claim 1 wherein the separation unit is an air stripping unit.

17. The apparatus of claim 1 further comprising an adsorbent bed having an inlet in fluid communication with the separation unit liquid outlet, and an outlet in fluid communication with the electrolyzer inlet.

* * * * *